US012138767B2

(12) United States Patent
Werner

(10) Patent No.: US 12,138,767 B2
(45) Date of Patent: Nov. 12, 2024

(54) HAND-HELD POWER TOOL COMPRISING A LOCKING DEVICE

(71) Applicant: Robert Bosch GmbH, Stuttgart (DE)

(72) Inventor: Immanuel Werner, Bad Urach (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 17/692,544

(22) Filed: Mar. 11, 2022

(65) Prior Publication Data

US 2022/0305632 A1 Sep. 29, 2022

(30) Foreign Application Priority Data

Mar. 26, 2021 (DE) ..................... 10 2021 203 063.7

(51) Int. Cl.
*B25D 17/08* (2006.01)
*B23B 31/107* (2006.01)

(52) U.S. Cl.
CPC .......... *B25D 17/08* (2013.01); *B23B 31/1071* (2013.01); *B25D 2217/0042* (2013.01); *B25D 2250/231* (2013.01); *Y10T 279/17076* (2015.01)

(58) Field of Classification Search
CPC ............ B25D 17/08; B25D 2217/0042; B25D 2250/231; B23B 31/1071; Y10T 279/17076
See application file for complete search history.

(56) References Cited

U.S. PATENT DOCUMENTS 4,502,824 A * 3/1985 Dohse ...................... B23Q 3/12 173/13
5,199,833 A * 4/1993 Fehrle .................. B25D 17/088 408/239 R
5,340,245 A * 8/1994 Bloechle ............... B23B 31/005 279/19.3
5,601,388 A * 2/1997 Lauterwald .......... B25D 17/088 408/239 R
5,669,730 A * 9/1997 Bidaux .................. B25D 17/08 403/321
6,241,026 B1 * 6/2001 Wache ..................... B23Q 3/12 173/132

(Continued)

FOREIGN PATENT DOCUMENTS

DE 35 16 541 A1 11/1986
DE 3516541 C2 * 3/1994 ............. B25D 17/06

(Continued)

*Primary Examiner* — Eric A. Gates
(74) *Attorney, Agent, or Firm* — Maginot, Moore & Beck LLP

(57) ABSTRACT

A hand-held power tool includes a tool receiver that includes a tubular tool holder configured to lock an insert tool therein by an assigned locking device via at least one locking element. The locking device includes a pressure sleeve that is spring-loaded via an assigned spring element, and a stop sleeve, the stop sleeve having a contact surface on its inner circumference, and the spring-loaded pressure sleeve pressing the at least one locking element in a locking position against the contact surface. The tubular tool holder has at least one recess in which the at least one locking element in the locking position is located, at least portionally, the at least one recess having a ramp-type guideway. The at least one locking element is displaceable along the ramp-type guideway from the locking position to an unlocking position.

9 Claims, 4 Drawing Sheets

200 140 224 228 275 229 250 223 216 260 226 227 244 236 232 150 210 218 209 190 201 202 206 201 202 214 211 212 245 240 292 225 205 242 270 230 280 220 291 281 248 249 231 235 234 221 222 112 110 203

210 250 505 216 300 520 510 211 218 240 420 530

(56) References Cited

U.S. PATENT DOCUMENTS 6,536,780 B2 * 3/2003 Baumann ............. B25D 17/088 279/22
6,543,789 B2 * 4/2003 Frenzel ................ B25D 17/088 279/74
6,659,473 B2 * 12/2003 Below .................. B25D 17/088 279/82
6,669,206 B2 * 12/2003 Hanke .................... B25D 17/06 279/74
8,172,235 B2 * 5/2012 Furusawa ............ B25D 17/088 279/22
8,210,545 B2 * 7/2012 Hild .................... B23B 31/1071 279/19.6
8,672,331 B2 * 3/2014 Braun .................... B25D 17/24 279/22
10,286,536 B2 * 5/2019 Mohanasundaram ....................... B25D 17/088
2002/0050365 A1 * 5/2002 Bongers-Ambrosius .................... B25D 11/04 173/128
2003/0089509 A1 * 5/2003 Wanek ................. B25D 17/088 173/48
2005/0224243 A1 * 10/2005 Baumann ............. B25D 17/088 173/128
2005/0232715 A1 * 10/2005 Baumann ............. B25D 17/088 408/226
2013/0206436 A1 8/2013 Thorson et al.
2015/0197002 A1 * 7/2015 Didier .................. B25D 17/088 173/109
2022/0118594 A1 * 4/2022 Werner ............... B23B 31/1071
2022/0388137 A1 * 12/2022 Mandel ................ B25D 11/005

FOREIGN PATENT DOCUMENTS

DE 195 21 993 A1 1/1997
DE 197 08 176 A1 9/1998
DE 102006057934 A1 * 6/2008 ............. B23B 31/11
EP 0456003 A1 * 11/1991
EP 1293305 A1 * 3/2003 ........... B25D 17/088
EP 2910338 A1 * 8/2015 ............. B25D 16/00
EP 2 894 009 A1 7/2017

* cited by examiner

HAND-HELD POWER TOOL COMPRISING A LOCKING DEVICE

This application claims priority under 35 U.S.C. § 119 to application no. DE 10 2021 203 063.7, filed on Mar. 26, 2021 in Germany, the disclosure of which is incorporated herein by reference in its entirety.

BACKGROUND

Known from EP 2 894 009 A1 is a hand-held power tool that has a locking device for locking an insert tool in a tubular tool holder. The locking device has locking elements that, in an assigned locking position, are pressed by a spring-loaded pressure sleeve against a contact surface of a stop sleeve. The locking elements are embodied, by way of example, as pawls.

SUMMARY

The present disclosure relates to a hand-held power tool, comprising a tool receiver that has a tubular tool holder in which an insert tool can be locked by an assigned locking device via at least one locking element, the locking device having a pressure sleeve that is spring-loaded via an assigned spring element, and a stop sleeve, the stop sleeve having a contact surface on its inner circumference, and the spring-loaded pressure sleeve pressing the at least one locking element in a locking position against the contact surface.

The disclosure relates to a hand-held power tool, comprising a tool receiver that has a tubular tool holder in which an insert tool can be locked by an assigned locking device via at least one locking element, the locking device having a pressure sleeve that is spring-loaded via an assigned spring element, and a stop sleeve, the stop sleeve having a contact surface on its inner circumference, and the spring-loaded pressure sleeve pressing the at least one locking element in a locking position against the contact surface. The tubular tool holder has at least one recess in which the at least one locking element in the locking position is located, at least portionally, the at least one recess having a ramp-type guideway, and the at least one locking element being displaceable along the ramp-type guideway from the locking position to an unlocking position.

As a result of the ramp-type guideway being provided in the recess of the tool holder, the amount force required for inserting the insert tool into the tool holder and for unlocking an insert tool locked in the tool holder can advantageously be reduced. The ramp-type guideway in this case safely and reliably supports displacement of the at least one locking element from the locking position to the unlocking position, since axial displacement of the at least one locking element, between a locking and an unlocking position, is also in each case directly converted by the ramp-type guideway into a radial displacement.

According to one embodiment, the at least one locking element comprises a locking sphere of a predefined diameter, the ramp-type guideway being of a length that is greater than or equal to the predefined diameter.

This makes it possible to provide a ramp-type guideway that has a comparatively low pitch.

Preferably, the ramp-type guideway has a pitch angle in the range of from 15° to 45°.

The realization of a comparatively low pitch angle makes it possible, advantageously, to achieve a smooth, sliding and steady movement of the at least one locking element. A suitably selected angle of invitation in this case makes it possible, advantageously, to set a locking and unlocking force that in each case is to be applied by a user, as well as a required sleeve travel.

The length of the ramp-type guideway preferably corresponds to at least one third of a longitudinal extent assigned to the at least one recess.

This makes it possible to provide a sufficiently long ramp-type guideway.

According to one embodiment, the spring-loaded pressure sleeve is displaceable, against a spring force of the assigned spring element, in the longitudinal direction of the tubular tool holder in order to displace the at least one locking element, along the ramp-type guideway, from the locking position to the unlocking position.

As a result, advantageously, only a displacement of the spring-loaded pressure sleeve is required to displace the at least one locking element from the locking position to the unlocking position. This can advantageously be effected by displacing the spring-loaded pressure sleeve by means of an assigned locking sleeve.

Preferably, a locking sleeve is provided, which is displaceable in the longitudinal direction of the tubular tool holder for the purpose of displacing the spring-loaded pressure sleeve against the spring force of the assigned spring element.

A simple and uncomplicated unlocking operation is thus achievable by displacement of the locking sleeve.

According to one embodiment, the spring-loaded pressure sleeve has a load collar against which the assigned spring element bears in order to press the spring-loaded pressure sleeve against the at least one locking element.

Spring loading of the spring-loaded pressure sleeve, for the purpose of driving the at least one locking element, is thus easily realized.

Preferably, the locking sleeve has a load portion, the assigned spring element spring-loading the load collar of the spring-loaded pressure sleeve against the load portion when the at least one locking element is in the locking position.

The spring-loaded pressure sleeve can thus safely and reliably press the locking sleeve, by the spring force of the assigned spring element, into an assigned locking position.

According to one embodiment, the spring-loaded pressure sleeve is displaceable by a displacement of the at least one locking element, against a spring force of the assigned spring element, in the longitudinal direction of the tubular tool holder.

As a result, advantageously, only a displacement of the spring-loaded pressure sleeve is required to displace the at least one locking element from the locking position to the unlocking position. This makes it possible, in the case of a corresponding process of an insert tool being inserted into the tubular tool holder, for the spring-loaded pressure sleeve to be displaced by a displacement of the at least one locking element, by means of the insert tool, against the spring-loaded pressure sleeve. A single-handed insertion process is thus achievable.

According to one embodiment, the hand-held power tool is realized in the manner of a hammer drill or chipping hammer, the tubular tool holder comprising a hammer tube.

A suitable hand-held power tool can thus be provided in a simple, uncomplicated manner.

BRIEF DESCRIPTION OF THE DRAWINGS

The disclosure is explained more fully in the following description on the basis of exemplary embodiments represented in the drawings, in which.

DETAILED DESCRIPTION

In the figures, elements that have the same or a comparable function are denoted by identical references and described in greater detail only once.

Figure 1:
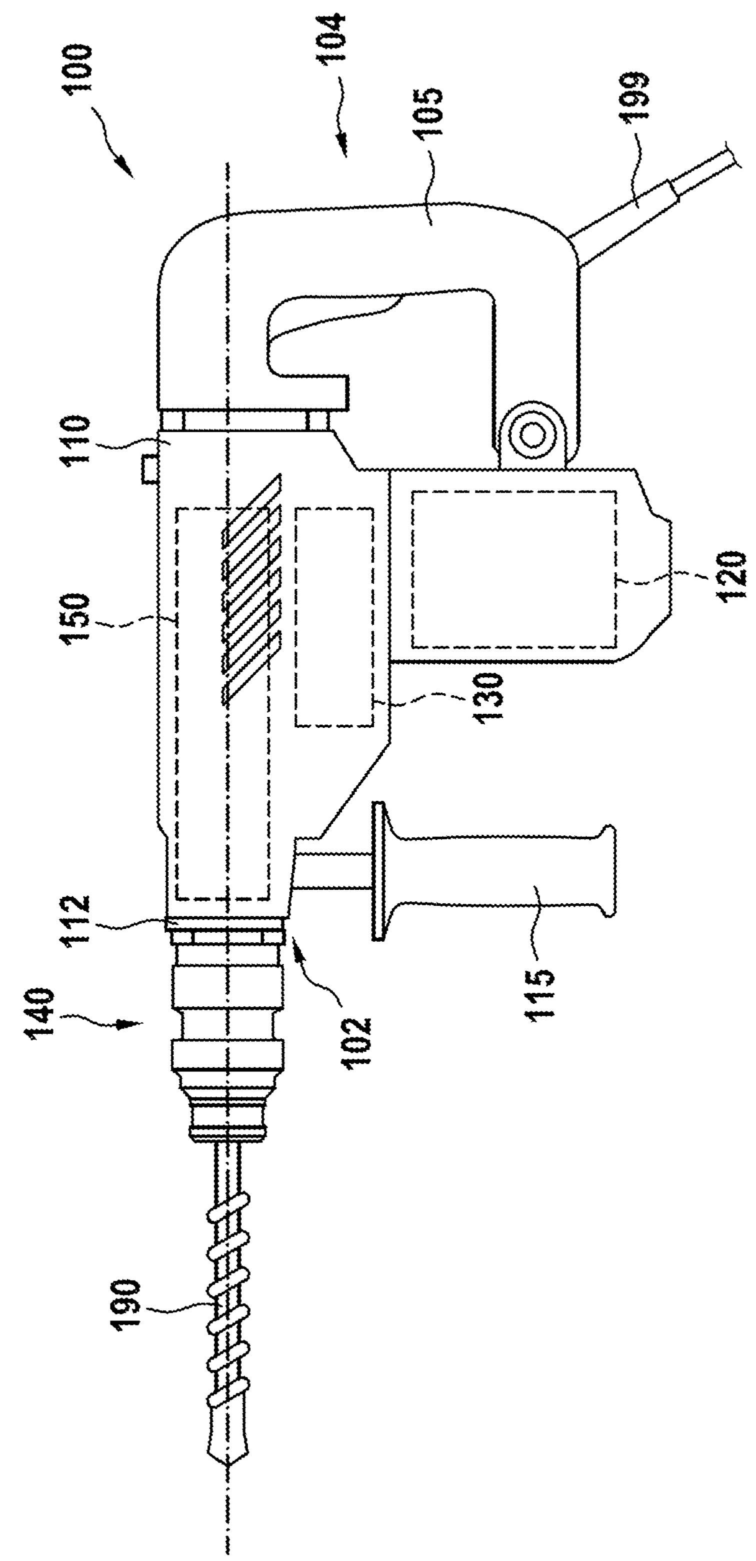
FIG. 1 shows a side view of a hand-held power tool having a tool receiver according to the disclosure.

FIG. 1 shows an exemplary hand-held power tool 100 having a housing 110 located in which, illustratively, there is a drive unit 120 for driving a tool receiver 140. The tool receiver 140 is preferably designed to receive an insert tool 190. Preferably, the tool receiver 140 is a 22 mm HEX tool receiver, but may also be realized as an SDSmax or SDSplus tool receiver, or as any other suitable tool receiver.

Optionally, there is a transmission 130 assigned to the drive unit 120. However, the hand-held power tool 100 may also be realized without the transmission 130.

Furthermore, the hand-held power tool 100 preferably has a percussion mechanism 150 for generating percussion pulses when the hand-held power tool 100 is in a percussive operating mode. The generation of percussion pulses by means of the percussion mechanism 150 is sufficiently known to persons skilled in the art. A suitable percussion mechanism with which the percussion mechanism 150 may be realized is also sufficiently known to persons skilled in the art, such that, in the interest of simple and concise description, a detailed description of the percussion mechanism 150, and of the functionality of the percussion mechanism 150, is not provided here.

Illustratively, the housing 110, on its side 104 that faces away from the tool receiver 140, has a handle 105, and on its side 102 that faces toward the tool receiver 140 has an optional ancillary handle 115. Preferably, the housing 110, on its side 102, is provided with an end flange 112.

In addition, the hand-held power tool 100 can be operated, for example, by connection to a mains power supply, i.e. can be connected to a mains power supply via a power cable 199. However, the hand-held power tool 100 may instead also be operated without a cable, e.g. via a battery pack.

Preferably, the hand-held power tool 100 is realized in the manner of a hammer drill or chipping hammer. Such a hand-held power tool 100 is sufficiently known from the prior art, and therefore, in the interest of conciseness, a detailed description is not provided here.

Figure 2:
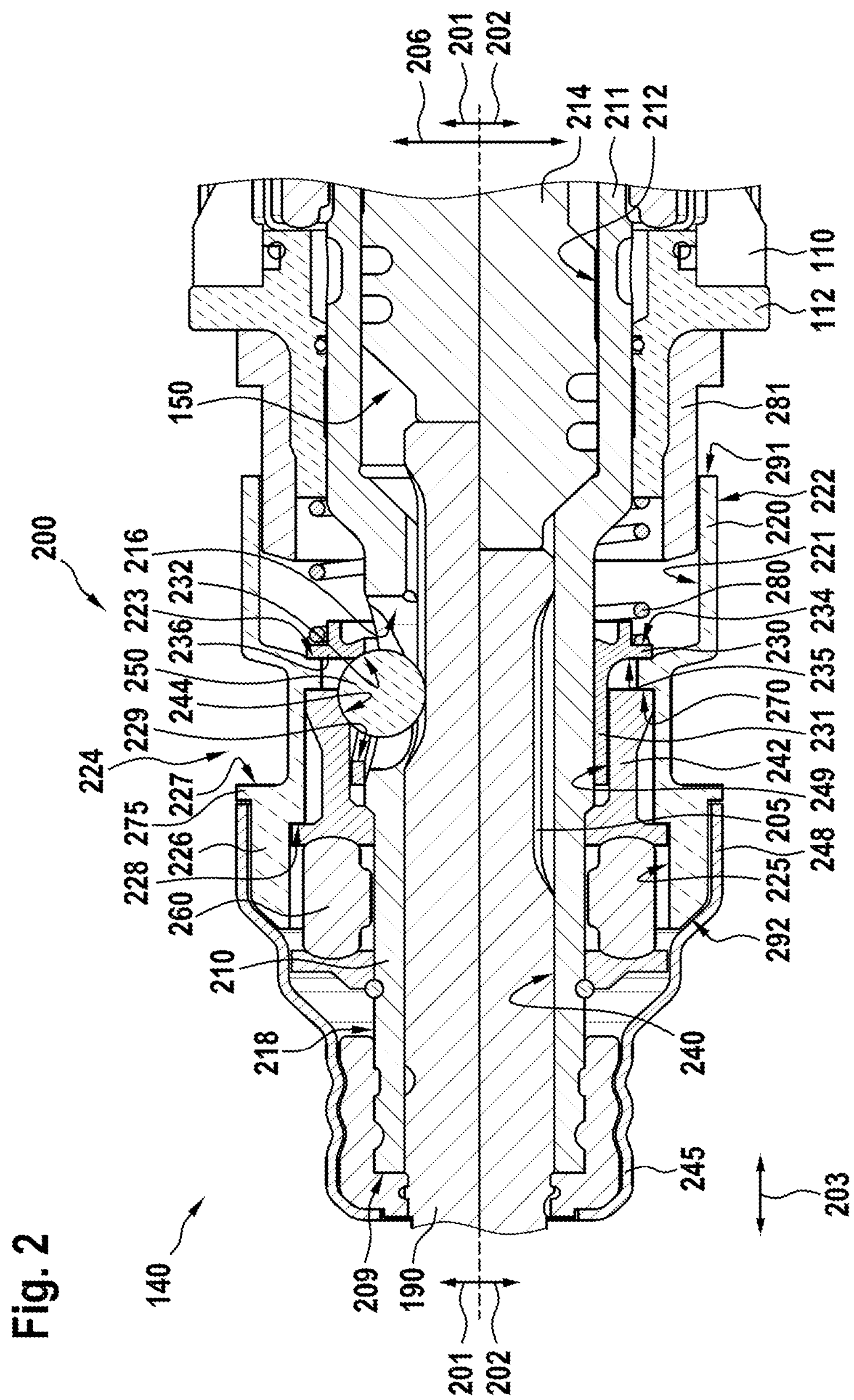
FIG. 2 shows a longitudinal section through the tool receiver from FIG. 1, in the locking state.

FIG. 2 shows the tool receiver 140 from FIG. 1, as well as a detail of the housing 110 of the hand-held power tool 100 from FIG. 1 provided with the end flange 112. The tool receiver 140 preferably has a locking device 200, by means of which the exemplary insert tool 190 from FIG. 1 is locked in the tool receiver 140. Exemplarily, the locking device 200 is shown in a locking state. The tool receiver 140, and thus also the locking device 200, illustratively has a longitudinal extent 203 that defines an axial direction, or longitudinal direction, and has a transverse extent 206 that defines a radial direction.

The tool receiver 140 preferably has a tubular tool holder 210, which has at least one recess 216. Preferably, the tool holder 210 has a hammer tube 211, and is preferably realized as a single piece with the latter.

Illustratively, the tool holder 210 realizes an internal receiver 240 for receiving the insert tool 190. The hammer tube 211 exemplarily realizes an internal receiver 212, in which there is preferably located at least one striker 214 assigned to the percussion mechanism 150 from FIG. 1.

In an upper half of the picture, as viewed in the direction of arrows 201, the tool receiver 140 is shown exemplarily before a percussion pulse is transmitted from the striker 214 to the insert tool 190. In the lower half of the image, as viewed in the direction of arrows 202, the tool receiver 140 is exemplarily shown in percussion mode during the transmission of a percussion pulse from the striker 214 to the insert tool 190.

The insert tool 190 illustratively has a locking portion 205, which faces toward the striker 214 and via which the insert tool 190 is locked in the tool holder 210, and thus in the tool receiver 140, by the locking device 200. Preferably, assigned to the locking device 200 there is at least one locking element 250, located in the at least one recess 216 of the tool holder 210, for locking the insert tool 190.

Preferably, two or three locking elements 250 are provided, each locking element engaging respectively in an assigned recess of the tool holder 210. However, more than three locking elements 250 may be provided. Illustratively, the locking element 250 is realized as a locking sphere. However, the locking element 250 may also be realized in any other way, for example as a roller or pawl, or may be of any other shape having a spherical portion.

It is to be noted at this point that the exemplary realization represented in FIG. 2 is based on the use of three locking balls. These are preferably each arranged at an angular distance of 120° relative to each other. Therefore, in FIG. 2, there is also no locking sphere in the lower half of the image, as viewed in the direction of arrows 202, since the lower half of the image is arranged with an offset of 180° relative to the upper half of the image, as viewed in the direction of arrows 201, in which a locking sphere of the locking device 200 is shown.

Illustratively, the locking device 200 has a pressure sleeve 230 that spring-loaded via an assigned spring element 280, has and a stop sleeve 242. The stop sleeve 242 preferably has a contact surface 244 on its inner circumference 249. The spring-loaded pressure sleeve 230 preferably has a load collar 236 against which the assigned spring element 280 bears in order to press the spring-loaded pressure sleeve 230 into a locking position, as shown. Illustratively, the load collar 236 has an abutment edge 234 against which the assigned spring element 280 bears.

It is to be noted that, in the context of the present disclosure, the term "sleeve" is to be understood to include any round, preferably elongate, internally hollow object into which something can be inserted. Accordingly, in the context of the present disclosure, the term "sleeve" also includes a wide ring, or a plurality of interconnected webs extending, for example, on a cylindrical surface, the circumferential end of which is annular, etc.

Preferably, the spring-loaded pressure sleeve 230 presses the at least one locking element 250 in the locking position against the contact surface 244 of the stop sleeve 242. For this purpose, the spring-loaded pressure sleeve 230 preferably has at least one pressure surface 232 for applying force to the at least one locking element 250 in the locking position. The pressure surface 232 in this case preferably faces toward the locking element 250. Preferably, the spring-loaded pressure sleeve 230 is displaceable, against a spring force of the assigned spring element 280, in the longitudinal direction 203 of the tool holder 210 in order to displace the at least one locking element 250 from the locking position to the unlocking position.

Illustratively, the spring-loaded pressure sleeve 230 additionally has at least one receiver 229, or preferably respectively one receiver per locking element. The at least one receiver 229 is exemplarily realized in a sleeve-shaped body 231 of the spring-loaded pressure sleeve 230. The sleeve-shaped body 231 is preferably guided in an axially displaceable manner on an outer circumference 218 of the tool holder 210.

The at least one locking element 250 is preferably received with play in the at least one receiver 229, i.e. in such a manner that the at least one locking element 250 can move in an unhindered manner in the receiver 229, within predefined tolerances. The at least one locking element 250 preferably engages via the recess 216 of the tool holder 210, at least in regions, in the locking portion 205 of the insert tool 190, and thus locks the latter in the tool holder 210, or in the tool receiver 140.

In addition, the locking device 200 preferably has a locking sleeve 220, which is displaceable in the longitudinal direction 203 of the tool holder 210 in order to displace the spring-loaded pressure sleeve 230 from its locking position to an unlocking position. This displacement is effected against the spring force of the spring element 280. Alternatively, the locking sleeve 220 and the spring-loaded pressure sleeve 230 may also be embodied as a single piece, or at least the sleeve-shaped body 231 of the spring-loaded pressure sleeve 230 may be realized as an integral part of the locking sleeve 220.

Preferably, the locking sleeve 220 is provided with a groove-shaped grip region 224. This groove-shaped grip region 224 illustratively realizes an annular grip cavity 227. In this case, the annular recessed grip cavity 227, as viewed in the longitudinal direction 203, preferably has a circular cross-section but may alternatively also have any other cross-section, e.g. a polygonal cross-section.

The locking sleeve 220 may comprise a first material, and the spring-loaded pressure sleeve 230 may comprise a second material. The first material is preferably plastic, in particular a dimensionally stable plastic, e.g. hard plastic. Furthermore, the plastic may be realized as a fiber-reinforced plastic, in particular fiber-reinforced and/or carbon-fiber-reinforced plastic, e.g. polyamide with glass fiber. The second material is preferably a metallic material, preferably steel. In particular, the second material is preferably a hardenable material, e.g. metal, sintered material.

Illustratively, the locking sleeve 220 has a first axial end 291 that faces toward the end flange 112, and has an opposite, second axial end 292. In the region of the first axial end 291, the locking sleeve 220 preferably has a guide portion 222. In the region of the second axial end 292, the locking sleeve 220 preferably has an engagement portion 226. The groove-shaped grip region 224 is preferably located, in the longitudinal direction 203 of the tool holder 210, between the engagement portion 226 and the guide portion 222.

The guide portion 222 preferably realizes an internal receiver 221, in which the load collar 236 of the spring-loaded pressure sleeve 230 and the spring element 280 are located, at least partially. In this case, the guide portion 222 preferably has an end wall 223 that faces toward the groove-shaped grip region 224 and that realizes a load portion against which the spring element 280 illustratively spring-loads the load collar 236 in the locking position of the at least one locking element 250. Exemplarily, an abutment edge 235 of the load collar 236 is spring-loaded against the end wall 223, or the load portion 223.

Illustratively, the guide portion 222 serves to guide the locking sleeve 220 on a guide sleeve 281. The latter is preferably attached to the end flange 112 of the housing 110.

The engagement portion 226 preferably realizes an internal receiver 225, in which a damping element 260 is preferably located when the locking device 200 is in the locking state, as shown in FIG. 2. Illustratively, the damping element 260 is annular and located on the outer circumference 218 of the tool holder 210. In addition, the damping element 260 preferably bears, in the longitudinal direction 203 of the tool holder 210, against the stop sleeve 242 against which there also bears a first inner collar 228 of the locking sleeve 220. A second inner collar 270 of the locking sleeve 220, exemplarily formed by the load portion 223 of the locking sleeve 220, also bears against the stop sleeve 242.

Illustratively, there is an outer collar 275 assigned to the engagement portion 226. The outer collar 275 preferably forms a transition from the engagement portion 226 to the groove-shaped grip region 224.

Preferably, when the locking device 200 is in the locking state, the engagement portion 226 engages in a protective cap 245. The protective cap 245 is preferably located at a free end 209 of the tool holder 210.

Illustratively, the protective cap 245 is provided with a receiving portion 248. Received in the receiving portion 248, for example, is the damping element 260, as well as the stop sleeve 242, at least portionally. Preferably, when the locking device 200 is in the locking state, at least the engagement portion 226 of the locking sleeve 220 engages in the receiving portion 248.

For the purpose of locking the insert tool 190 in the tool receiver 140, the insert tool 190 is pushed into the tool holder 210 in the direction of the striker 214. The insert tool 190 in this case presses against the at least one locking element 250 located in the recess 216 and displaces it against the spring-loaded pressure sleeve 230 and thereupon with the latter in such a manner that the at least one locking element 250 is pushed out of the recess 216 in the direction of the end flange 112 to such an extent that an end of the insert tool 190 that faces toward the striker 214 is pushed past the at least one locking element 250. The spring-loaded pressure sleeve 230 thereupon, by the spring force of the spring element 280, presses the at least one locking element 250 back into the recess 216, where the at least one locking element 250 engages, at least in regions, in the locking portion 205 of the insert tool 190, and thus locks the insert tool 190 in the tool holder 210.

When the locking device 200 is in the locking state, the spring-loaded pressure sleeve 230, by the spring force of the spring element 280, presses the at least one locking element 250 against the at least one contact surface 244 of the stop sleeve 242, and into the recess 216 of the tool holder 210, for the purpose of locking the insert tool 190. The spring-loaded pressure sleeve 230 in this case also presses the locking sleeve 220 against the stop sleeve 242, such that the outer collar 275 of the locking sleeve 220 preferably bears in a flush manner against the receiving portion 248 of the protective cap 245.

For the purpose of unlocking the locking device 200, the locking sleeve 220 is preferably displaced, in the longitudinal direction 203 of the tool receiver 140, against the spring-loaded pressure sleeve 230, and thus with the latter against the spring force of the spring element 280 in the direction of the guide sleeve 281. The spring-loaded pressure sleeve 230 in this case takes the at least one locking element 250 with it, so that the latter is pushed out of the recess 216 of the tool holder 210 at least to such an extent that it releases the locking portion 205 of the insert tool 190, and thus releases the insert tool 190.

Figure 3:
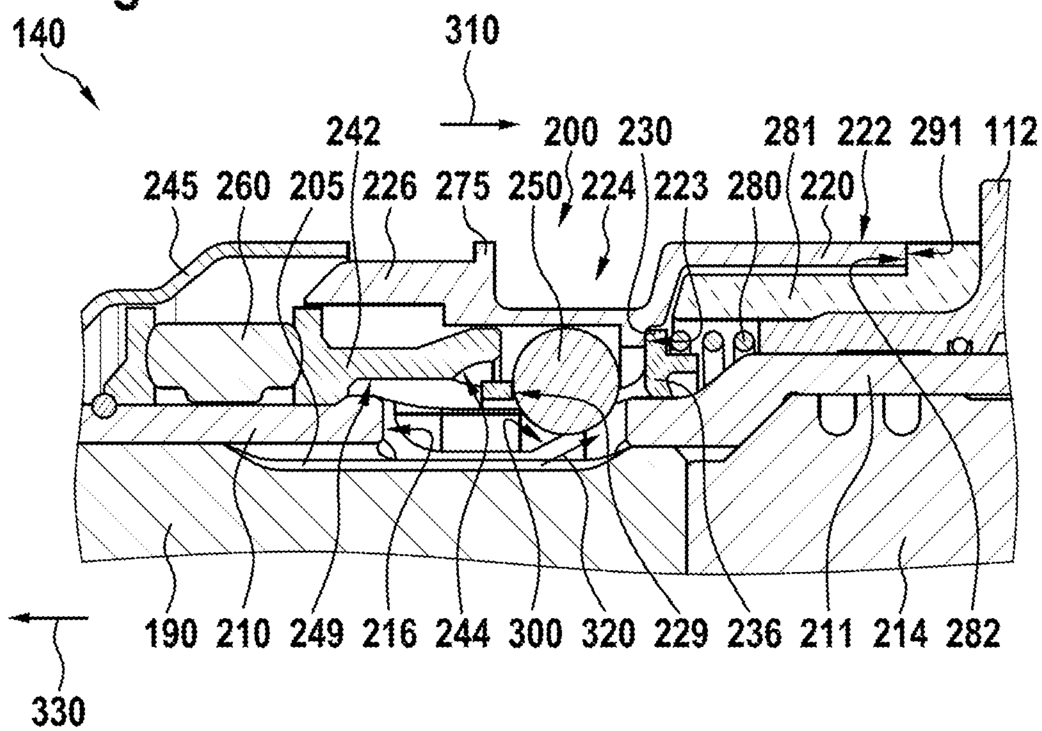
FIG. 3 shows a longitudinal view of a detail of the tool receiver from FIG. 2, in the unlocking state.

FIG. 3 shows the tool receiver 140 from FIG. 2 with the protective cap 245, and with the locking device 200 from FIG. 2. In contrast to FIG. 2, the locking device 200 is exemplarily shown here in an unlocking state.

As described in relation to FIG. 2, the locking device 200 comprises the locking sleeve 220, the guide portion 222 of which is guided on the guide sleeve 281. The guide sleeve 281 is located on the end flange 112, which is attached to the housing 110 of the hand-held power tool 100 from FIG. 1. In addition, the guide portion 222 merges into the groove-shaped grip region 224 of the locking sleeve 220, which terminates at the outer collar 275 of the locking sleeve 220. The outer collar 275 is assigned to the engagement portion 226 of the locking sleeve 220.

In addition, the locking device 200 comprises the at least one locking element 250, which is located in the receiver 229 of the spring-loaded pressure sleeve 230 and engages in the recess 216 of the tool holder 210 from FIG. 2. The spring-loaded pressure sleeve 230 is forced against the load portion 223 of the locking sleeve 220 by the spring element 280, which is illustratively located between the end flange 112 and the load collar 236 of the spring-loaded pressure sleeve 230.

Preferably, the recess 216 comprises a ramp-type guideway 300, the at least one locking element 250 being displaceable, along the ramp-type guideway 300, from its locking position to an unlocking position. In FIG. 3, the at least one locking element 250 is exemplarily shown in the unlocking position.

For the purpose of unlocking the locking device 200, the locking sleeve 220 is displaced, along the longitudinal direction 203 of the tool receiver 140 in a direction 310, from the locking position shown in FIG. 2 to the unlocking position shown in FIG. 3. In the unlocking position, illustratively, the axial end 291 of the locking sleeve 220 bears against an annular shoulder 282 of the guide sleeve 281, such that the annular shoulder 282 realizes an end stop for the locking sleeve 220.

The load portion 223 of the locking sleeve 220 in this case presses the load collar 236 of the spring-loaded pressure sleeve 230, against the spring force of the spring element 280, in the direction of the guide sleeve 281, such that the spring element 280 is illustratively compressed, i.e. tensioned, between the load collar 236 and the end flange 112. The spring-loaded pressure sleeve 230 takes the at least one locking element 250 with it, and pushes the latter along the ramp-type guideway 300 from its locking position, in the direction of an arrow 320, into the unlocking position shown in FIG. 3. The further the at least one locking element 250 is pushed along the ramp-type guideway 300, the more favorable a corresponding angular relationship to the other components involved becomes, such that the amount of force required from a user for displacement is continuously reduced.

In the unlocking position, the at least one locking element 250 is preferably pushed out of the recess 216 of the tool holder 210 at least to the extent that it releases the locking section 205 of the insert tool 190, and thus the insert tool 190. The insert tool 190 can now be drawn out of the tool holder without force, in the direction of an arrow 330.

Figure 4:
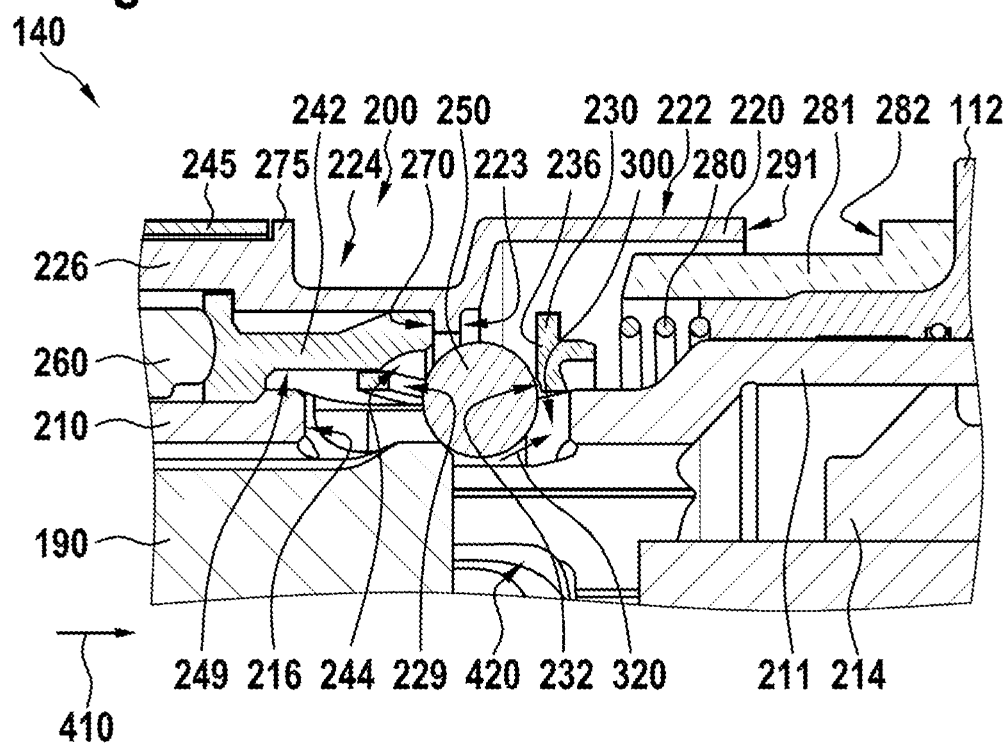
FIG. 4 shows a longitudinal section of a detail of the tool receiver from FIG. 2 during a process of insertion of an insert tool.

FIG. 4 shows the tool receiver 140 from FIG. 2 with the protective cap 245, and with the locking device 200 from FIG. 2. The locking device 200 is exemplarily shown here during a process of insertion of the insert tool 190 from FIG. 2 into the tool holder 210 of the tool receiver 140, which is provided with the recess 216. In addition, FIG. 4 shows a further exemplary recess 420 in the tool holder 210, which is designed to receive a further locking element.

As described in relation to FIG. 2, the locking device 200 comprises the locking sleeve 220, the guide portion 222 of which is guided on the guide sleeve 281. The guide sleeve 281 is located on the end flange 112, which is attached to the housing 110 of the hand-held power tool 100 from FIG. 1. In addition, the guide portion 222 merges into the groove-shaped grip region 224 of the locking sleeve 220, which terminates at the outer collar 275 of the locking sleeve 220. The outer collar 275 is assigned to the engagement portion 226 of the locking sleeve 220, and illustratively bears in a flush manner against the protective cap 245.

In addition, the locking device 200 comprises the at least one locking element 250, which is located in the receiver 229 of the spring-loaded pressure sleeve 230 and engages in the recess 216 of the tool holder 210. The spring-loaded pressure sleeve 230 is forced against the at least one locking element 250 by the spring element 280, which is illustratively located between the end flange 112 and the load collar 236 of the spring-loaded pressure sleeve 230.

Preferably, the recess 216 comprises the ramp-type guideway 300, the at least one locking element 250 being displaceable, along the ramp-type guideway 300, from its locking position to an unlocking position. In FIG. 4, the at least one locking element 250 is exemplarily shown in an intermediate position between the locking position from FIG. 2 and the unlocking position from FIG. 3.

In the insertion process, the insert tool 190 is pushed into the tool holder 210 in the direction of the striker 214, illustratively in the direction of an arrow 410. In this process, the insert tool 190 presses against the at least one locking element 250 located in the recess 216 and displaces the latter, on the one hand, against the spring-loaded pressure sleeve 230 and, on the other hand, with the latter in such a manner that the at least one locking element 250 is pushed out of the recess 216, in the direction of the arrow 320 from FIG. 3, along the ramp-type guideway 300 until an end of the insert tool 190 that faces toward the striker 214 can be pushed past the at least one locking element 250. As a result of the spring-loaded pressure sleeve 230 being displaced, against the spring force of the spring element 280, in the direction of the guide sleeve 281, the spring element 280 is illustratively compressed, i.e. tensioned, between the load collar 236 and the end flange 112, as described in relation to FIG. 3.

Figure 5:
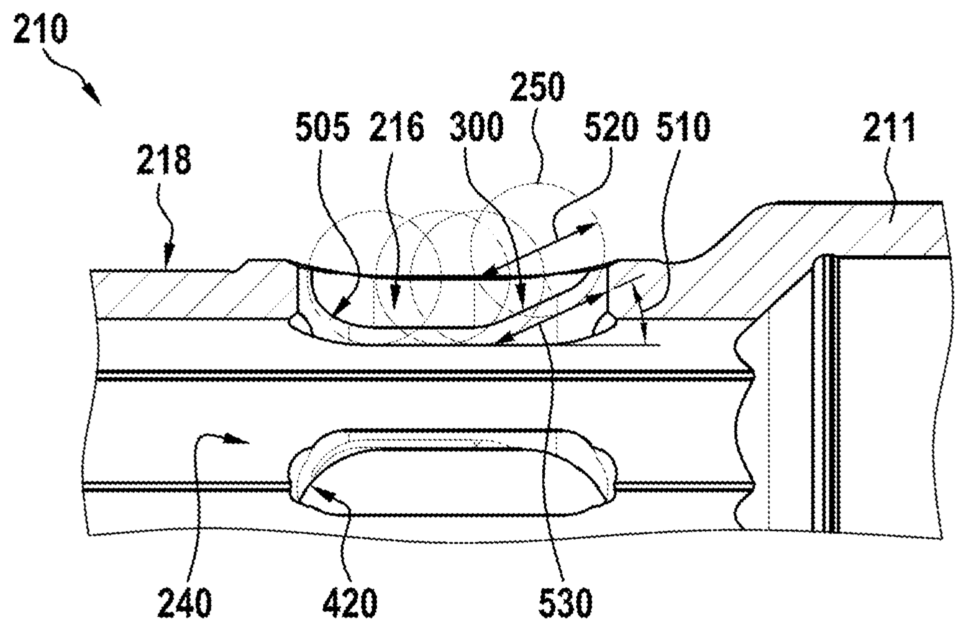
FIG. 5 shows a longitudinal section of a detail of a tool holder of the tool receiver from FIG. 1 and FIG. 2.

FIG. 5 shows the tool receiver 210 from FIG. 2 to FIG. 4 with the recess 216, and with the further recess 420 from FIG. 4. Also shown, exemplarily, is the at least one locking element 250 from FIG. 2 to FIG. 4. Illustratively, the at least one locking element 250 is indicated in its locking position—on the left in FIG. 5—and its unlocking position—on the right in FIG. 5—as well as two intermediate positions.

As described in relation to FIG. 3 and FIG. 4, the recess 216 comprises the ramp-type guideway 300 for guiding the at least one locking element 250, as well as an exemplary chamfer 505 at its end that is diametrically opposite the ramp-type guideway 300. The ramp-type guideway 300 preferably has a pitch angle 510 in the range of from 15° to 45°.

Illustratively, the at least one locking element 250 is a locking sphere of a predefined diameter 520. Preferably, the ramp-type guideway 300 is of a length 530 that is greater than or equal to the predefined diameter 520.

Figure 6:
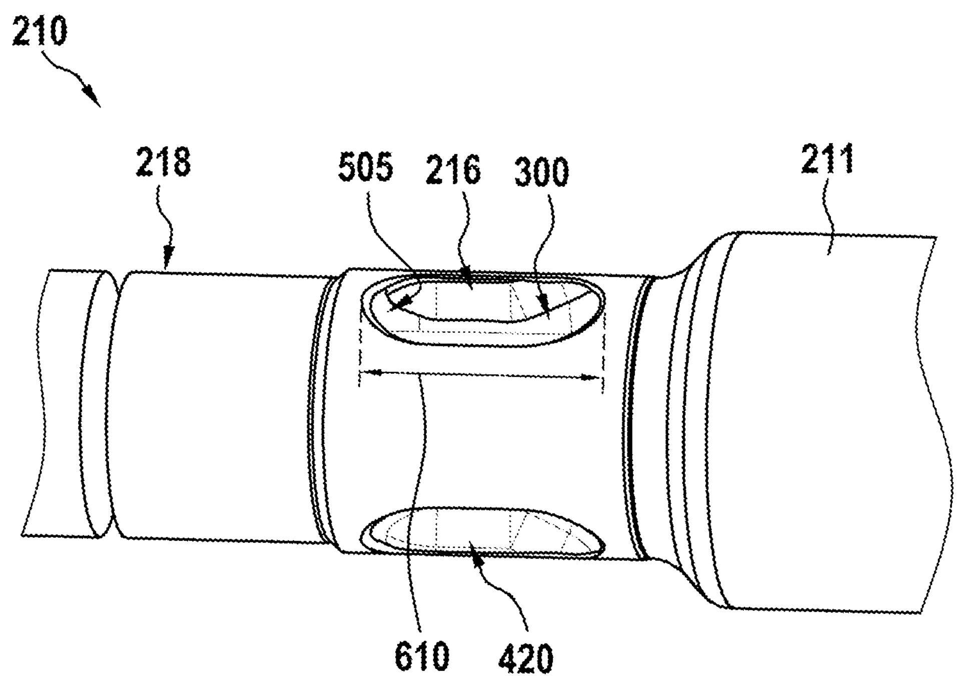
FIG. 6 shows a perspective view of the detail of the tool holder from FIG. 5.

FIG. 6 shows the tool receiver 210 from FIG. 2 to FIG. 5 with the recess 216, and with the further recess 420 from FIG. 4. The recess 216 comprises the ramp-type guideway 300, as well as the exemplary chamfer 505 from FIG. 5, which is diametrically opposite the ramp-type guideway 300 the recess 216. The at least one recess 216 illustratively has an assigned longitudinal extent 610. Preferably, the length 530 from FIG. 5 of the ramp-type guideway 300 corresponds to at least one third of the longitudinal extent 610.

What is claimed is:

1. A hand-held power tool, comprising: a tool receiver that includes a tubular tool holder configured to lock an insert tool therein by an assigned locking device via at least one locking element, the locking device comprising: a pressure sleeve that is spring-loaded via an assigned spring element, and a stop sleeve, the stop sleeve having a contact surface on its inner circumference, and the spring-loaded pressure sleeve pressing the at least one locking element, in a locking position, against the contact surface, wherein: the tubular tool holder has at least one recess in which the at least one locking element is at least partially located in the locking position, the at least one recess having a first axial end region, a second axial end region having a ramp-type guideway, and a through portion arranged axially between the first and second axial end regions, the at least one locking element comprises a locking sphere of a predefined diameter, the ramp-type guideway is of a length that is greater than or equal to the predefined diameter, the length measured along a line parallel to a surface of the ramp-type guideway from an outer diameter of the recess at one end of the ramp-type guideway to an inner diameter of the recess at the other end of the ramp-type guideway, and the at least one locking element is displaceable along the ramp-type guideway from the locking position to an unlocking position.

2. The hand-held power tool according to claim 1, wherein the ramp-type guideway has a pitch angle, defined relative to a longitudinal direction of the tool receiver, in a range of from 15° to 45°.

3. The hand-held power tool according to claim 1, wherein the length of the ramp-type guideway corresponds to at least one third of a longitudinal extent of the at least one recess.

4. The hand-held power tool according to claim 1, wherein the spring-loaded pressure sleeve is configured to be displaced, against a spring force of the assigned spring element, in a longitudinal direction of the tubular tool holder to displace the at least one locking element, along the ramp-type guideway, from the locking position to the unlocking position.

5. The hand-held power tool according to claim 4, wherein the locking device further comprises a locking sleeve is configured to be displaced in the longitudinal direction of the tool receiver to displace the spring-loaded pressure sleeve against the spring force of the assigned spring element.

6. The hand-held power tool according to claim 1, wherein the spring-loaded pressure sleeve has a load collar against which the assigned spring element bears thereby pressing the spring-loaded pressure sleeve against the at least one locking element.

7. The hand-held power tool according to claim 6, wherein:

a locking sleeve is configured to be displaced in the longitudinal direction of the tool receiver to displace the spring-loaded pressure sleeve against the spring force of the assigned spring element;

the locking sleeve has a load portion; and the assigned spring element is configured to spring-load the load collar of the spring-loaded pressure sleeve against the load portion when the at least one locking element is in the locking position.

8. The hand-held power tool according to claim 1, wherein the spring-loaded pressure sleeve is displaceable by a displacement of the at least one locking element, against a spring force of the assigned spring element, in a longitudinal direction of the tubular tool holder.

9. The hand-held power tool according to claim 1, wherein:

the hand-held power tool is a hammer drill or chipping hammer; and the tubular tool holder comprises a hammer tube.

* * * * *